United States Patent [19]

Te Velde et al.

[11] Patent Number: 4,729,636

[45] Date of Patent: Mar. 8, 1988

[54] PASSIVE DISPLAY DEVICE HAVING MOVABLE ELECTRODES AND METHOD OF MANUFACTURING

[75] Inventors: Ties S. Te Velde; Adriana T. A. Zegers Van Duijnhoven, both of Eindhoven, Netherlands

[73] Assignee: U.S. Philips Corporation, New York, N.Y.

[21] Appl. No.: 748,243

[22] Filed: Jun. 24, 1985

[30] Foreign Application Priority Data

Jul. 12, 1984 [NL] Netherlands ........................ 8402201

[51] Int. Cl.[4] ........................ G02B 5/04; G02B 26/02; G09G 3/16

[52] U.S. Cl. .................................... 350/269; 340/763; 350/266

[58] Field of Search ........................ 350/266, 269, 272; 340/764, 763, 783, 788

[56] References Cited

U.S. PATENT DOCUMENTS 4,178,077 12/1979 Te Velde ............................ 350/486

4,420,897 12/1983 Castleberry ........................ 340/763

4,519,676 5/1985 Te Velde ............................ 350/269

4,584,056 4/1986 Perret et al. ........................ 340/763

*Primary Examiner*—John K. Corbin

*Assistant Examiner*—Vincent J. Lemme

*Attorney, Agent, or Firm*—Paul R. Miller

[57] ABSTRACT

A psssive display device comprises a first supporting plate (10) and a second supporting plate (11) at least one of which is transparent. The device comprises display elements each having at least one fixed electrode (12, 13) and an electrode 16 which is arranged so as to be movable with respect to the said electrode (12, 13) and has apertures. The movable electrode 16 can be moved by electrostatic forces between two final positions determined by engaging surfaces (14, 15). In each of the final positions the movable electrode 16 engages an engaging surface (14, 15) whose surface structure is not congruent with that of the surface of the electrode so that a finite number of discrete engaging points is formed between the movable electrode and its engaging surfaces. Furthermore methods are described for manufacturing such a display device.

24 Claims, 18 Drawing Figures

PASSIVE DISPLAY DEVICE HAVING MOVABLE ELECTRODES AND METHOD OF MANUFACTURING

Figure 1A:
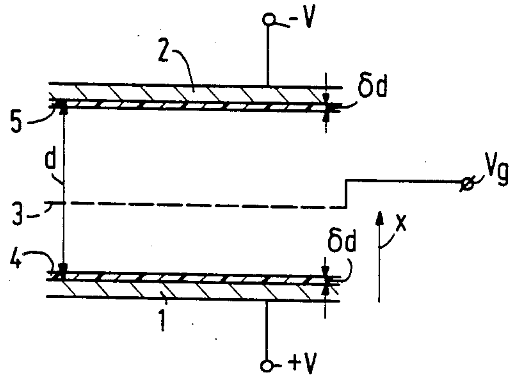
FIG.1a PRIOR ART

The invention relates to a passive display device comprising a first and a second supporting plate, at least one of which is transparent, a number of display elements each having at least one fixed electrode and an electrode which is arranged so as to be movable with respect to said fixed electrode by electrostatic forces and which is kept separated from the fixed electrode by means of an electrically insulating layer with the movable electrode having a pattern of apertures and being movable between two final positions determined by engaging surfaces.

The invention furthermore relates to a method of manufacturing such a device.

A passive display device of the type described is disclosed in "SID International Symposium Digest of techn. papers", April 1980, pp. 116–117. In each display element the movable electrode can be moved between two stable positions so that the absorption or reflection for light incident on the display device can be controlled for each picture element. The movable electrode is connected to one of the supporting plates by means of a number of resilient elements. The forces which drive the movable electrode from one stable position to the other may be electrostatic forces whether or not in combination with the resilient forces generated by the resilient elements. In a first embodiment of the display device the movable electrode is moved between two electrodes provided on the facing surfaces of the first and second supporting plates. The resilient forces occuring in the resilient elements may or may not be negligible with respect to the electrostatic forces. In a second embodiment of the display device the electrostatic forces drive the second electrode from one stable position to the other and the resilient forces in the resilient elements are used to drive the second electrode back to its initial position. In both cases short-circuiting of the movable electrode and a fixed electrode is prevented by an electrically insulating layer between the electrodes. In the first embodiment in the most general form the total force $F_t$ acting on the movable electrode may be written as $F_t=F_1+F_2+F_3$, wherein $F_1$ is the electrostatic force between the movable electrode and one fixed electrode; $F_2$ is the electrostatic force between the movable electrode and the other fixed electrode, and $F_3$ is the mechanical resilient force generated in the resilient element. From the given formula for $F_t$, various embodiments of the display device may be derived. In the case in which $F_3$ is negligibly small with respect to the terms $F_1$ or $F_2$, the movable electrode is moved substantially by means of electrostatic forces. In the case in which $F_1$ or $F_2$ is equal to zero, the above-indicated second embodiment is obtained.

In one embodiment the display device is filled with a liquid having a color contrasting with the color of the surface of the movable electrode which faces the light incident on the display device. Dependent on which stable position the movable electrode is in, the picture element in question will assume, for the observer, either the color of the surface of the movable electrode or the color of the contrasting liquid. In this manner a picture can be built up by means of the picture elements. The speed with which the information in the displayed picture can be varied depends mainly on the time which the movable electrode needs to move from one stable position to the other stable position. In this connection the apertures in the movable electrode play an important part since the size and the number of the apertures determine the resistance which the movable electrodes experience in the liquid when they change from one position to the other. In Applicant's published European Patent Application No. 85 459, corresponding to U.S. Pat. No. 4,519,676, the contents of which may be deemed to be incorporated herein, a passive display device is described in which measures are taken to reduce the switching time of the movable electrode. The resilient elements in this known display device are not provided beside but below the movable electrode. This permits the use of larger apertures in the movable electrode, which results in faster switching times than in display devices in which the resilient elements are present at the circumference of the movable electrode, as described in published British Patent Specification No. 1533458 corresponding to U.S. Pat. No. 4,178,077 also in the name of Applicants.

It is the object of the invention to provide an improved passive display device in which, irrespective of the position of the resilient elements, fast switching times of the movable electrodes may be obtained. A further object of the invention is to provide a convenient method of manufacturing such a display device.

According to the invention, a passive display device comprising a first and a second supporting plate, at least one of which is transparent, a number of display elements each having at least one fixed electrode and an electrode which is arranged so as to be movable with respect to the fixed electrode by electrostatic forces, and which electrode is kept separated from the fixed electrode by means of an electrically insulating layer with the movable electrode having a pattern of apertures and being movable between two final positions determined by engaging surfaces, is characterized in that in at least one of the final positions the movable electrode engages an engaging surface whose surface structure is not congruent with that of the adjoining surface of the movable electrode, so that a finite number of discrete engaging points is formed between which the surface of the movable electrode is spaced from the adjoining surface of the engaging surface.

The invention is based on the recognition of the fact that the crossing time of the movable electrode is determined substantially by two different hydrodynamic or aerodynamic effects. One effect is the aerodynamic or hydrodynamic resistance which the electrode moving in the medium (gas or liquid) experiences at some distance from the surfaces of the supporting plates. The size and the number of the apertures in the movable electrode is relevant to this aerodynamic or hydrodynamic resistance. This effect is described in the above-mentioned European Patent Application No. 85 459. The other effect is the resistance which the movable electrode experiences when moving away from or approaching an engaging surface. It is especially this latter effect to which the present invention relates. It has been found that the free space between the engaging surface and the movable electrode determines the value or the aerodynamic or hydrodynamic resistance to a considerable extent. In particular the accessibility of the medium (liquid or gas) flowing through the apertures to or from the free space is of importance. When the distance between the movable electrode and the engaging surface is small, the medium can flow into or out of the space determined by the distance only slowly. Consequently, the speed at which the movable electrode leaves or assumes the stable, final, engaging position will therefore be low. According to the invention the movable electrode in the stable final positions engages the surface of the respective adjacent engaging surface via a structured surface. In this manner a finite number of discrete engaging points is formed while between the engaging points the surface of the movable electrode is free from the engaging surface with some intermediate space. The intermediate space is determined by the distance between the facing surfaces of the movable electrode and the supporting place. The structured surface hence serves as a spacing layer with engaging points formed by the structured surface. The intermediate space determined by the spacing layer, in other words the height of the engaging points, should be chosen in accordance with the extent to which the hydrodynamic or aerodynamic resistance determined thereby is to be reduced.

A further embodiment according to the invention may be characterized in that on at least one side of the movable electrode the engaging points are formed by a surface which is structured so as to be symmetrical with respect to the apertures in the movable electrode. In this case the structured surface constitutes hardly any or only a small resistance to the medium flowing in the intermediate free space from or to an aperture in the movable electrode.

An additional advantage is that under the influence of the electrostatic forces the surface area of the movable electrode present between the engaging points can flex resiliently in the direction of the engaging surface against which it engages. When the movable electrode is switched to its other stable final position, the elastic energy accumulated in the electrode accelerates the detaching of the electrode from its engaging surface. This is a so-called "bumper spring effect". When the movable electrodes comprise a diffuse-reflecting layer it is not necessary in principle to provide the layer with an extra structured surface. A diffuse-reflecting surface itself has a surface structure, which forms statistically distributed engaging points with which the object of the invention can be achieved.

According to the invention the structured surface may form part of the movable electrode. According to an alternative embodiment the structured surface may form part of an engaging surface.

Another embodiment according to the invention may be characterized in that, at the area of the engaging points, the structured surface consists of an electrically insulating material. When the engaging points are formed by an electrically insulating material, an extra insulating layer between the movable electrode and an electrode provided on a supporting plate may be omitted.

A particular embodiment according to the invention is characterized in that the apertures in the movable electrode are arranged according to a recurring pattern of groups of apertures and the engaging points are situated between the groups of apertures. The apertures in each group of apertures may be arranged according to a given pattern, while the groups mutually may also be arranged according to a given pattern. This construction, in which there are super structures, has the advantage that the number of engaging points is further reduced and variations are possible as regards the above-mentioned bumper spring effect.

The movable electrode preferably consists of a material which gives sufficient rigidity to the electrode and with which a white diffuse-reflecting surface may be realised, if so desired. The material should preferably be such as to allow forming of the movable electrode in a stress-free manner. Good results in this respect are obtained with materials consisting of metal alloys, in particular silver alloys. Silver alloys are excellently suitable when the resilient elements form one assembly with the movable electrode.

The invention is of importance not only for passive display devices which are filled with a liquid. The invention is also of importance for evacuated or gas-filled devices. The inertia upon detaching the movable electrode in the last-mentioned device is determined in particular by aerodynamic effects. Hence in this case also the use of a structured surface as described above is of importance. An example of such a device is described in the above-mentioned British Patent Specification 1,533,458. The device is then operated in the transmission mode in which the movable electrodes serve as light shutters.

The invention also relates to a method of manufacturing the passive display device. For formation of the structured surface the method according to the invention comprises the following steps:

(a) providing a layer of a first material on a substrate,
(b) providing on the layer a layer of a second material,
(c) etching a pattern of apertures in the layer of the second material by means of a photo-etching method, and
(d) removing at least parts of the layer of the first material to form the structured surface by undercutting by the apertures in the layer of the second material.

This method may be used both for the formation of a structured layer which forms part of an engaging surface, and for the formation of a structured layer which forms part of the movable electrode. According to an embodiment of the invention the method may be further characterized in that the layer of the first material and/or the layer of the second material have/has a composition which is inhomogeneous over the thickness of the layer or layers such as to have an etching sensitivity varying over the thickness of the layer of layers. The expression "etching sensitivity" is to be understood to mean herein the dissolving rate of a material in an etchant. A greater etching sensitivity means a higher dissolving speed of the material in the etchant in question. An etching sensitivity which varies over the thickness of the layer of the first material and/or the layer of the second material then permits of a great range of possibilities with respect to the form of the structured surface. According to another embodiment the layer of the second material may also form the material of the movable electrode and a pattern of electrodes may be etched in the layer simultaneously with the etching of the apertures. An advantage of this embodiment is that the movable electrode itself is used as a mask for the undercutting process. The engaging points of the structured surface then are symmetrical with respect to the apertures in the electrode. When the structured surface forms part of the movable electrode, etchants may be used for which the first material has a greater etching sensitivity than the second material. In this case, during the undercutting process, the first material is etched away entirely and the second material is etched away partly. A modified embodiment of this method is characterized in that the etching sensitivity of the layer of the first material decreases in the direction towards the layer of the second material. According to this method, punctiform parts of the first material remain on the layer of the second material after the undercutting process. It will be obvious that the undercutting process is carried out for a period of time which is sufficient to release the movable electrode entirely from the underlying layer.

A further embodiment of the method according to the invention may be characterized in that prior to the photo-etching process a further layer of a material having properties similar to those of the layer of the first material is provided on the layer of the second material, in which further layer the shape and apertures which are desired for the movable electrodes are then etched by means of a photo-etching method. By means of this embodiment of the method the electrode is provided, on two sides, with a structured surface with engaging points situated symmetrically with respect to the apertures or between groups of apertures.

A method of obtaining a structured surface which forms part of an engaging surface is characterized according to the invention in that the etching sensitivity of the layer of the first material increases in the direction towards the layer of the second material so that a structured surface is obtained which forms part of the substrate. According to this method, punctiform parts of the first material remain on the substrate surface after the undercutting process.

A further extension of the method according to the invention consists in that a layer of a third material may be present between the substrate and the layer of the first material and is removed after the formation of the structured surface by means of a selective etchant. The layer of the third material ensures that the movable electrode is provided on at least one surface with pillars which form the engaging points. In the case in which the structured surface forms part of the substrate surface such a layer of a third material may be present between the layer of the first material and the layer of the second material. In this case pillars are formed which form part of the substrate (engaging surface). The first material may be a metal or a metal alloy, for example, aluminium, nickel, copper, magnesium or alloys of these metals. The second material preferably is an electrically insulating material. Non-restrictive examples of substances which must be more or less selectively etchable with respect to the second material consists of the group $TiO_2$, CdS, $CeO_2$, CuCl, $MgF_2$, MgO, $Nb_2O_5$, $Ta_2O_5$, $Y_2O_3$ and Zns. An evident advantage of an insulator is that no conductive tracks can remain after the undercutting which might cause short-circuit. The layers of the first material and the second material need not be homogeneous as regards the composition. Composite layers or layers the density of which varies over the layer thickness are possible. Numerous variations with respect to compositions of the layer and shape of the structured surface are possible without departing from the scope of this invention.

Figure 1B:
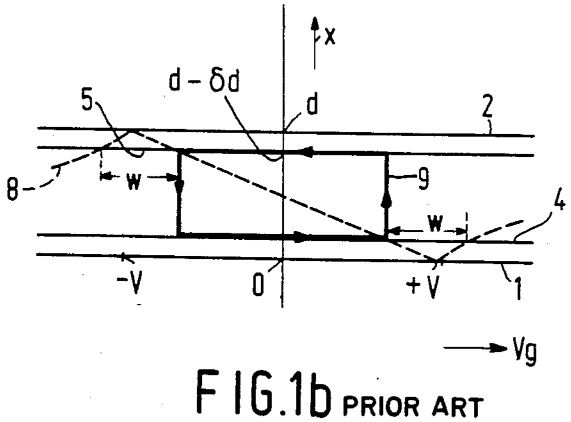
FIG.1b PRIOR ART
Figure 2:
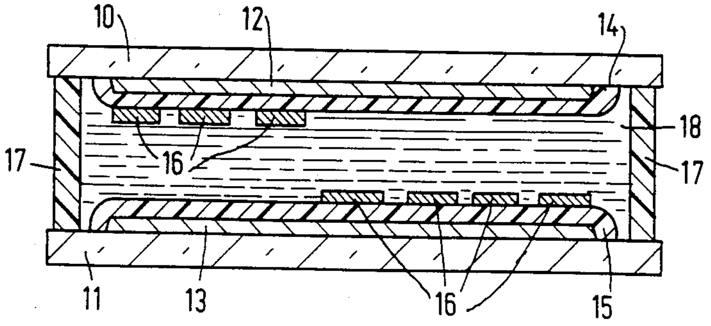
FIG.2 PRIOR ART
Figure 3:
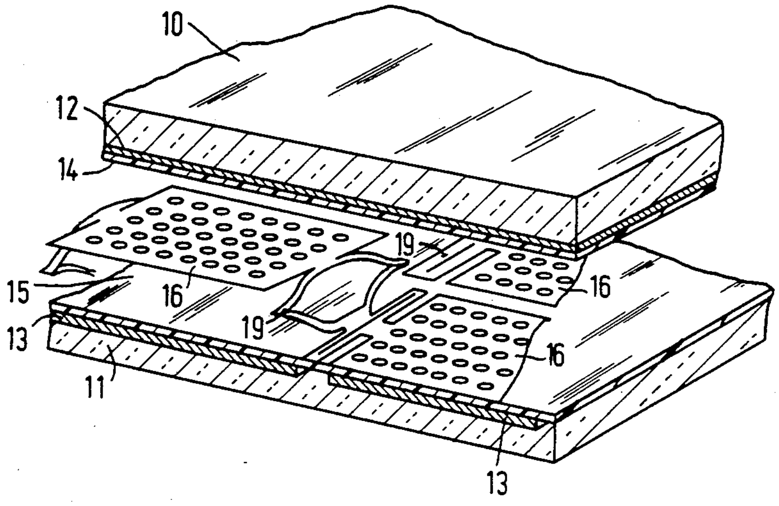
Figure 4A:
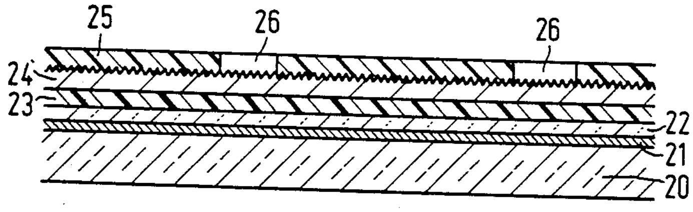
Figure 4B:
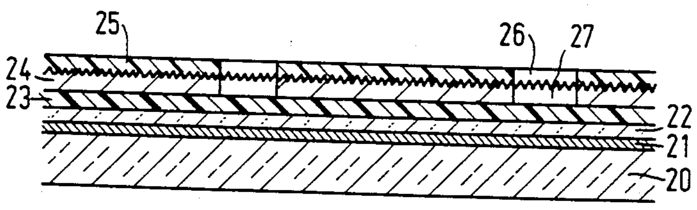
Figure 4C:
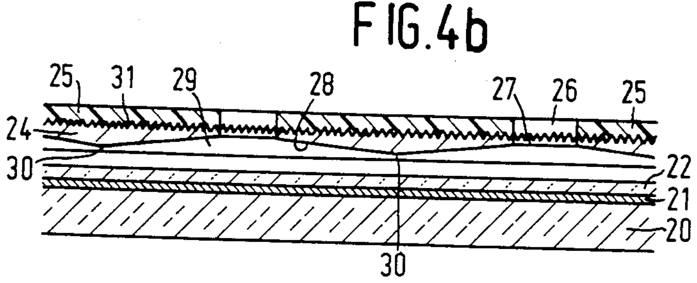
Figure 5A:
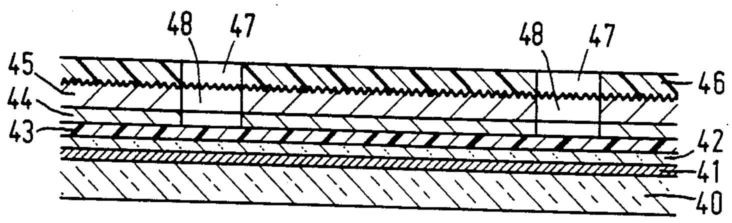
Figure 5B:
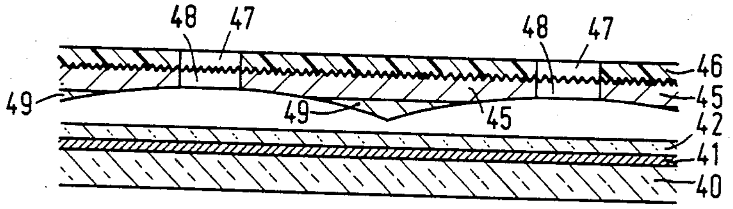
Figure 6A:
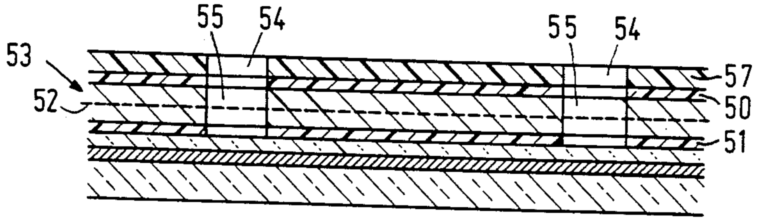
Figure 6B:
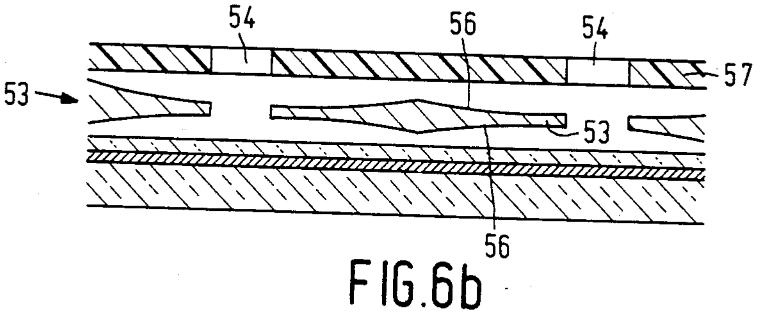
Figure 7A:
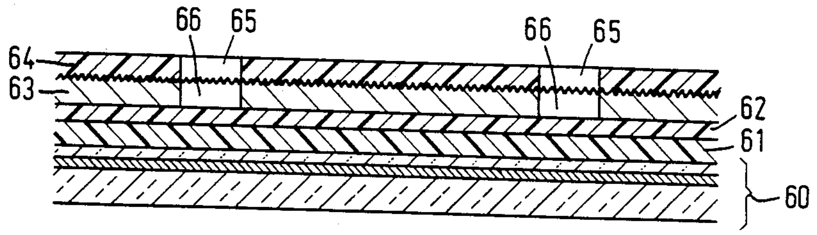
Figure 7B:
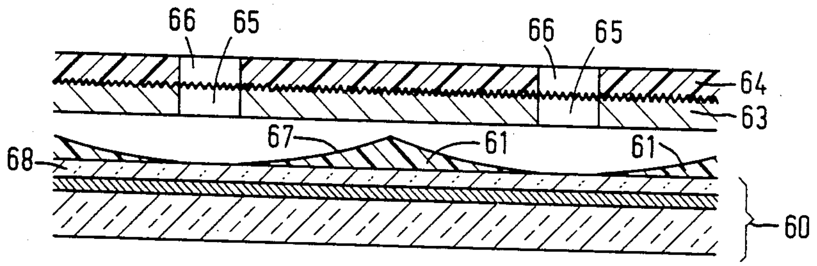
Figure 8:
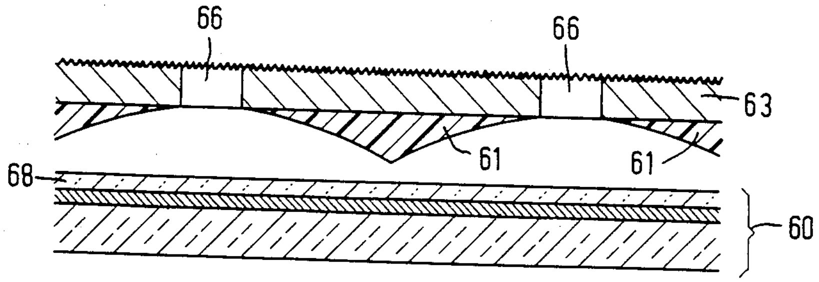
Figure 9A:
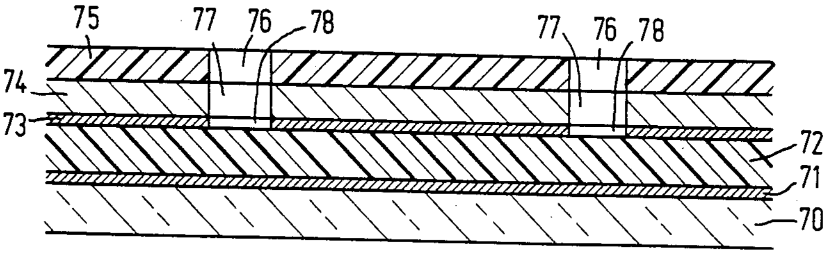
Figure 9B:
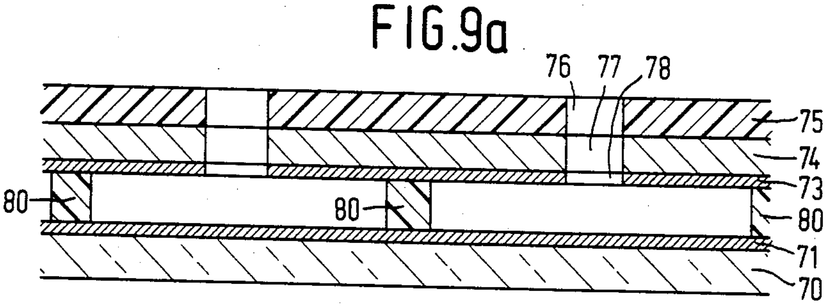
Figure 9C:
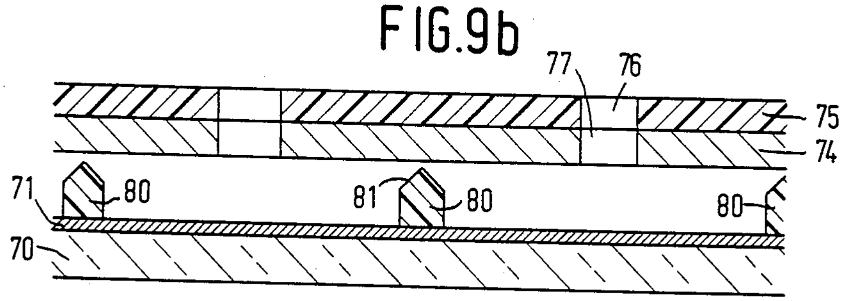
Figure 10:
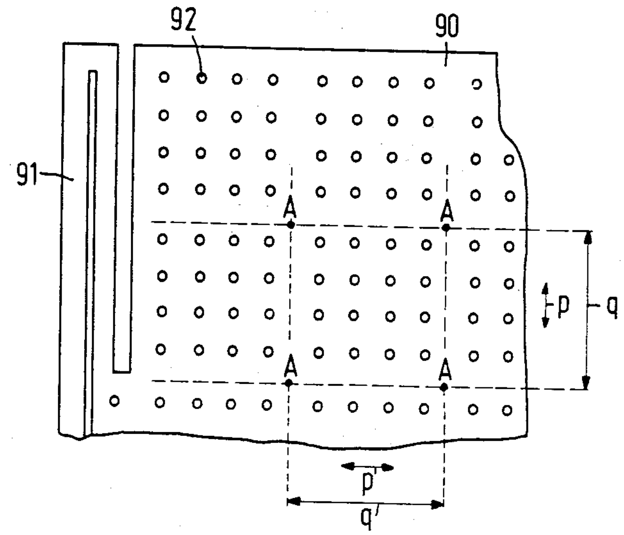

Various embodiments of the invention will now be described in greater detail, by way of example, with reference to the accompanying drawing, in which FIGS. 1*a* and 1*b* are diagrammatic drawings to explain a display device according to the "three-electrode-system", in which substantially electrostatic forces play a part, FIG. 2 is a diagrammatic sectional view of a display device according to the "three-electrode-system", FIG. 3 is a perspective view, partly broken away, of the device shown in FIG. 2, FIGS. 4*a*, 4*b* and 4*c* illustrate a first embodiment of the method according to the invention, FIGS. 5*a* and 5*b* illustrate a second embodiment of the method according to the invention, FIGS. 6*a* and 6*b* illustrate a third embodiment of the method according to the invention, FIGS. 7*a* and 7*b* illustrates a fourth embodiment of the method according to the invention, FIG. 8 illustrates a fifth embodiment of the method according to the invenion, FIGS. 9*a*, 9*b* and 9*c* illustrates a sixth embodiment of the method according to the invention, FIG. 10 is a plan view of an embodiment of a movable electrode.

Referring now to FIGS. 1*a* and 1*b* the operating principle will be explained of an electrode which is movable between two electrodes by electrostatic forces, as in an embodiment of the display device according to the invention.

FIG. 1*a* shows diagrammatically two fixed electrodes 1 and 2 at a mutual distance d. A movable electrode 3 is present between the electrodes 1 and 2 at a distance x from electrode 1. Insulating layers 4 and 5 are provided on the electrodes 1 and 2 having a thickness δd. As a result of this the electrode 3 can move between two extreme positions $x=\delta d$ and $x=d-\delta d$. Voltage pulses +V and −V are applied to the electrodes 1 and 2, while simultaneously a variable voltage pulse Vg is applied to electrode 3. With the dielectric constants of the liquid and the insulating layers being substantially equal, an electrostatic force $$p1 = \tfrac{1}{2}\epsilon\left(\frac{V - Vg}{d - x}\right)^2$$

directed towards electrode 2 and an electrostatic force $$p2 = \tfrac{1}{2}\epsilon\left(\frac{V + Vg}{x}\right)^2$$

directed towards electrode 1 are exerted on the electrode 3 per surface unit, wherein ε is the dielectric constant of the medium between the electrodes 1 and 2. The broken line which denotes the equilibrium between the forces is referenced 8 in FIG. 1*b*. The line 8 intersects the line $x=\delta d$ at a voltage $Vg=-V+\delta V$ and the line $x=d-\delta d$ at a voltage $Vg=+V-\delta V$. The equilibrium of electrode 3 is of course labile because, when the electrode 3 is moved from the equilibrium state over a small distance, the electrostatic force between the approaching electrodes becomes larger and the electrostatic force between the separating electrodes becomes smaller. The third electrode 3 as a result of this has two stable states in the range of voltages Vg between −V+δV and +V−δV, namely against the insulating layer 4 at $x=\delta d$ and against the insulating layer 5 at $x=d-\delta d$. When the electrode 3 engages, for example, the insulating layer 4, the voltage Vg may increase to substantially V−δV before the third electrode 3 flips over to the electrode 2. The voltage Vg can now decrease again to substantially $-V+\delta V$ before the electrode 3 again flips back to electrode 1. In this manner the electrode 3 traverses a substantially ideal hysteresis loop which is indicated by the line 9. As a result of this the device has a large threshold voltage and a memory.

An embodiment of a matrix display device according to the invention based on the above-described principle will be explained with reference to FIGS. 2 and 3 which are a sectional view and a perspective view partly broken away, respectively of the device. The device comprises two parallel supporting plates 10 and 11, with at least the supporting plate 10 being transparent. The supporting plates 10 and 11 are, for example, of glass or a different material. A transparent electrode 12 is provided on the supporting plate 10. Strip-shaped electrodes 13 are provided on the supporting plate 11. The electrodes 12 and 13 have a thickness of approximately 0.2 μm and are made, for example, from indium oxide and/or tin oxide. Electrically insulating layers 14 and 15 of quartz which are 1 to 2 μm thick are provided on the electrodes 12 and 13. The device furthermore comprises a number of movable electrodes 16 which are connected to the insulating layer 15 by means of a number of resilient elements 19. The electrodes 16 are interconnected in one direction by means of the resilient elements 19 and constitute strip-shaped electrodes which intersect the electrodes 13 substantially at right angles. The surface of the electrodes 16 facing the transparent supporting plate 10 is reflecting. The device is sealed by a rim of sealing material 17. The space between the supporting plates 10 and 11 is filled with an opaque, non-conductive liquid 18 having a contrasting color with the diffuse-reflecting color of the electrodes 16. The liquid 18 is formed, for example, by a solution of Sudan black in toluence. By applying voltages to the electrodes 12, 13 and 16, the electrodes 16 can be controlled from one stable state to the other. When the electrodes 16 are against the insulating layer 14, the ambient light is reflected by the electrodes 16. When the electrodes 16 are against the insulating layer 15, the electrodes 16 on the viewer's side are not visible through the transparent supporting plate 10, and the ambient light is absorbed by the liquid 18 or at least is reflected only in the color of the liquid 18. The device constitutes a so-called matrix display device in which the strip-shaped electrodes 13 constitute, for example, the row-electrodes and the strip-shaped electrodes 16 constitute the column electrodes of the device.

Upon writing the picture a starting condition is achieved in which all electrodes 16 are present on the side of the second supporting plate 11. The row electrodes 13 and the common electrode 12 are kept at a voltage of $+V$ and $-V$ Volts, respectively. The information for a driven row electrode 13 is simultaneously presented to all column electrodes 16. Voltage pulses $V_g$ of $+V$ Volt are applied to the column electrodes where electrode(s) 16 are required to flip over to the first supporting plate 10 at the crossing with the driven row electrode 13, while voltage pulses of 0 Volt are applied to the remaining column electrodes. After writing, all electrodes 16 can be brought back again to the second supporting plate 11 by simultaneously providing all column electrodes at $-V$ Volt for a short period of time. The insulating layers serve a three-fold purpose. First they prevent any electric contact between the movable electrodes 16 and the fixed electrodes 12 and 13. The second purpose relates to the energy consumption of the display device. When the electrode 16 is pressed against one of these layers an energy proportional to 1/d will be applied with each alternating voltage pulse, d being the thickness of the dielectric layer. The third purpose of the insulating layers relates to the switching properties of the display device. It follows from FIG. 1*b* that for points situated above the broken line 8 the movable electrode experiences a force directed towards the supporting plate 2, while for points situated below the broken line 8 the force is directed towards the supporting plate 11. With an extremely small layer thickness of the dielectric layer ($\delta \approx 0$) this means that switching has to carried out exactly at the point $+V$ Volt and $-V$ Volt to cause the movable electrode to pass from one position to the other. This is substantially impossible for practical reasons. A dielectric layer of some thickness provides a certain amount of relief because with such thickness the range within which switching can be carried out is expanded to the region indicated by W.

FIGS. 4*a*, 4*b* and 4*c* illustrate a first embodiment of the method with which a structured surface is obtained forming part of the movable electrode. A layer of a first material 23, a layer of a second material 24, and a layer of photolacquer 25 are provided on a substrate consisting of a supporting plate 20, a fixed electrode 21, consisting of a 0.2 micron thick chromium layer, and a dielectric layer 22. By means of conventional exposure and development, apertures 26 are provided in the layer 25. The shape of the movable electrodes and that of the resilient elements forming one assembly therewith can be provided simultaneously in the layer of photolacquer 25. Apertures 27 having a diameter of 4 microns and a pitch of 20 microns are etched at 60° C. with concentrated phosphoric acid ($H_3PO_4$) in the layer 24 which consists of a 0.6 micron thick aluminium layer. In this manner the FIG. 4*b* structure is obtained. The layer 23 is a 0.2 micron thick magnesium oxide (MgO) layer. Via the apertures 27 and the edges of the etched electrodes, the layer 23 and a part of the layer 24 are removed by undercutting at 40° C. by means of an etchant which, when completed with water to 1 liter, comprises 100 $cm^3$ $HNO_3$, 200 $cm^3$ $H_3PO_4$ and 5 gram $Fe_2(SO_4)_3$. As a result of this the layer 24 obtains a structured surface 28 with engaging points 30 which are situated symmetrically with respect to the apertures 27. Between the structured layer 24 (see FIG. 4*c*) and the layer 22 which consists of a 1.5 micron thick $SiO_2$ layer, conical cavities 29 overlapping each other have thus been obtained. Finally the photolacquer layer 25 is removed. The final result is a movable electrode 24 which is connected to the substrate by resilient elements and which around the apertures 27 has a thickness of 0.1 micron and has engaging points 30 which are situated symmetrically with respect to the apertures and have a height of approximately 0.5 micron. The surface 31 remote from the surface 28 is roughened or comprises a rough diffuse-reflecting surface.

FIGS. 5*a* and 5*b* illustrate a second embodiment in which a structured surface which forms part of the movable electrodes is also formed. A 0.3 micron thick $CeO_2$ layer 43 is provided on a substrate consisting of a glass supporting plate 40 with a tin oxide layer 41 for the fixed electrodes and a 1.5 micron thick $SiO_2$ layer 42 as a dielectric layer. A 0.3 micron thick aluminium layer 44 is vapour-deposited on the layer 43 succeeded by a 0.3 micron thick aluminium layer 45 with 4% silicon. The whole is covered with a photoresist layer 46 in which apertures 47 are then provided via an exposure process. FIG. 5*a* shows the situation after apertures 48 have been etched in the layers 44 and 45 at 60° C. by means of phosphoric acid. By undercutting via through the apertures 48, the layer 43 is removed entirely and the layer 44 is removed partly. The etchant used comprises, when completed with water to 1 liter, 50 $cm^3$ $H_2SO_4$; 50 $cm^3$ $H_2O_2$; 20 $cm^3$ $H_3PO_4$. The $CeO_2$ (layer 43) has a greater etching sensitivity to the etchant than the material of the layer 44. After the undercutting process, bosses 49 remain on the layer 45 as remainders of the layer 44, constituting the movable electrodes. The photoresist layer 46 is finally removed.

FIGS. 6*a* and 6*b* illustrate a method which results in a structured surface on both sides of the movable electrodes. The layer structure in FIG. 6*a* differs from that in FIG. 5*a* in that between two MgO layers 50 and 51, each 0.2 micron thick, a sandwich layer 53 of 0.3 micron aluminium, 0.02 micron copper, indicated by the broken line 52, and again 0.3 micron aluminium is present. This layer is obtained by first vapour-depositing aluminium and, halfway through the vapour deposition process, vapour-depositing copper at approximately 200° C. and terminating the process by the vapour deposition of a layer of aluminium. The copper diffuses slightly into the aluminium on both sides. Apertures 55 are etched through the layers 50, 51 and 53 via the apertures 54. The etchant used consists of 85% by weight of $H_3PO_4$; 12% by weight of acetic acid and 3% by weight of $HNO_3$, etching being carried out at a temperature of approximately 33° C. The situation now obtained is shown in FIG. 6*a*. FIG. 6*b* shows the situation after undercutting via through the apertures 55 by means of an etchant which, when completed with water to one liter, comprises 100 $cm^3$ $HNO_3$; 100 $cm^3$ $H_3PO_4$ and 5 gram $Fe_2(SO_4)_3$. The layers 50 and 51 have been etched away entirely while the layer 53 has been etched away partly because aluminium with copper has a smaller etching sensitivity for the undercutting agent used than pure aluminium. The layer 53 which forms the movable electrodes thus obtains a structured surface 56 on both sides of the layer 53. Of course the photoresist layer 57 is also removed finally.

FIGS. 7*a* and 7*b* shows a fourth embodiment of the method in which a structured surface of insulating material is formed. On a substrate 60 equal to that of the previously described methods, a one micron thick layer 61 of magnesium oxide (MgO) with 8% aluminium oxide ($Al_2O_3$) succeeded by a layer of magnesium oxide (MgO) 62 of 0.01 micron thickness are provided by vapour deposition. A layer 63 of a silver-chromium alloy with 0.5–5% by weight of chromium is sputtered or vapour-deposited on the latter layer up to a thickness of 0.45 micron succeeded by a photoresist layer 64. After providing apertures 65 in the resist layer 64 in the conventional manner, apertures 66 are etched in the layer 63 at room temperature through the apertures 65 by means of an etchant which, when with water to one liter, comprises a solution of 440 gram $Fe(NO_3)_3$ in 800 $cm^3$ of ethylene glycol. By undercutting through the apertures 66 the layer 62 is etched away entirely and the layer 61 is etched away partly. The etchant used in this case is 500 $cm^3$ $H_3PO_4$; 100 $cm^3$ $H_2SO_4$, completed with water to one liter, with the etching temperature being 65° C. In this manner a structured surface 67 is obtained formed by bosses 61 of insulating material adhering to the substrate 60. In this case the dielectric layer 68 may be omitted.

A modification of this embodiment consists in the reversed sequence of the layers 61 and 62. While using the same process steps as described with reference to FIGS. 7*a* and 7*b*, FIG. 8 gives the final result of the reversal. The insulating parts are rigidly connected to the surface of the movable electrode 63. In this case also the dielectric layer 68 may be dispensed with.

FIGS. 9*a* to 9*c* illustrate another embodiment of the method according to the invention. In this case the substrate is a glass supporting plate 70 on which a 0.2 micron thick chromium layer 71 is vapour-deposited as a fixed electrode. A one micron thick insulating layer 72 of magnesium oxide with 8% aluminium oxide is vapour-deposited on the layer. A 0.03 micron thick aluminium layer 73 and a 0.45 micron thick layer 74 of silver with 0.5–5% by weight of chromium are then vapour-deposited on the layer 72. Through the apertures 76 and the photoresist layer 75, apertures 77 are first etched by means of an etchant consisting of 440 gram of $Fe(NO_3)_3$ dissolved in 800 $cm^3$ of ethylene glycol and made up with water to one liter. Apertures 78 are then etched in the layer 73 by means of sodium hydroxide solution (10 gram of NaOH per liter of water) at 40° C. The resulting situation is shown in FIG. 9*a*. By the in-line apertures 76, 77 and 78, the layer 72 is etched away by undercutting to such an extent that only pillars 80 of approximately 2 microns in cross-section remain. This situation is shown in FIG. 9*b*. The etchant used for this undercutting consists of 500 $cm^3$ $H_3PO_4$; 100 $cm^3$ $H_2SO_4$ made up with water to 1 liter. With an etching temperature being approximately 65° C. Etching by means of an etchant on the basis of 500 $cm^3$ $H_3PO_4$ made up with water to 1 liter, is then carried out at 65° C. for approximately one minute. The layer 73 is etched away entirely with the pillars 80 having obtained a rounded shape 81. This situation is shown in FIG. 9*c*. The pillars 80 remain rigidly connected to the fixed electrode 71, a dielectric layer being in this case omitted. The photoresist layer 75 is finally removed. During vapour-depositing the layer 72, the composition may be varied over the thickness of the layer during the vapour deposition process. In this manner, the etching sensitivity over the thickness of the layer may also be varied. The layer 72 may also consist of $SiO_2$ which may be etched with hydrofluoric acid. The density of the layer can be varied throughout the thickness by varying the gas pressure during the vapour deposition process. By reversing the sequence of the layers 72 and 73 a construction can be obtained in a manner analogous to that described with reference to FIG. 8 in which the pillars 80 instead adhere to the layer 74 (the movable electrode).

FIG. 10 is an elevation of a movable electrode 90 having resilient elements 91. The apertures 92 are arranged according to a pattern of groups of apertures so that a so-called superstructure is formed. Within a group the apertures are repeated with a period p while the groups are repeated with a period $q=np$ $(n>1)$. The relative distances between the apertures 92, together with the etching rates and the etching times, determine the shape of the structured surface. The height of the engaging points will be largest in the places indicated by A, slightly less in the places between adjacent groups indicated by broken lines, and smallest in places situated between the apertures which belong to a same group. In this manner numerous variations can be obtained in the above-mentioned "bumper spring effect".

Although the method according to the invention has been described with reference to embodiments in which undercutting is carried out through the apertures in the movable electrode, it is not restricted thereto. As a mask for undercutting, any apertured layer may of course be used. Although the invention can particularly advantageously be used in the manufacture of display devices in which the resilient elements are present at the circumference of the movable electrodes, as described in British Patent Specification No. 1,533,458, the invention may also be applied to constructions in which the resilient elements are present below the movable electrodes, as described in published European Patent Application No. 85 459.

What is claimed is:

1. In a passive display device comprising first and second supporting plates with at least one of said plates being transparent, first and second fixed electrodes on facing surfaces of said first and second supporting plates, an electrically insulating layer on each of said first and second fixed electrodes, and third electrodes movable between said first and second fixed electrodes by electrostatic forces, said third movable electrodes having a pattern of apertures, wherein the improvement comprises a plurality of discrete engaging points provided between at least one surface of said third movable electrodes and said electrically insulating layer, said plurality of discrete engaging points separating said third movable electrodes from said electrically insulating layer.

2. A passive display device according to claim 1, wherein said plurality of discrete engaging points are provided by a surface, said surface being symmetrically structured to said pattern of apertures.

3. A passive display device according to claim 1 or claim 2, wherein said plurality of discrete engaging points are provided on said third movable electrodes.

4. A passive display device according to claim 3, wherein said plurality of discrete engaging points are provided on opposite surfaces of said third movable electrodes.

5. A passive display device according to claim 1 or claim 2, wherein said plurality of discrete engaging points are provided on said electrically insulating layers.

6. A passive display device according to claim 1 or claim 2, wherein said plurality of discrete engaging points consist of an electrically insulating material.

7. A passive display device according to claim 6, wherein said electrically insulating material also forms said electrically insulating layer.

8. A passive display device according to claim 1 or claim 2, wherein said pattern of apertures are provided in a recurring pattern of groups of apertures, said plurality of discrete engaging points being present between said groups of apertures.

9. A passive display device according to claim 1 or claim 2, wherein said third movable electrodes consist of a metal alloy.

10. A passive display according to claim 9, wherein said metal alloy is a silver alloy.

11. A method of manufacturing a passive display device, wherein said device comprises first and second supporting plates with at least one of said plates being transparent, first and second fixed electrodes on facing surfaces of said first and second supporting plates, an electrically insulating layer on each of said first and second fixed electrodes, third electrodes movable between said first and second fixed electrodes by electrostatic forces, said third movable electrodes having a pattern of apertures, and a plurality of discrete engaging points provided between at least one surface of said third movable electrodes and said electrically insulating layer, said plurality of discrete engaging points separating said third movable electrodes from said electrically insulating layer, said method comprising the steps of providing a layer of a first material on a substrate, providing a layer of a second material on said layer of said first material, etching a pattern of apertures through said layer of said second material, and removing parts of said layer of said first material to form said plurality of discrete engaging points by undercutting through said pattern of apertures in said layer of said second material, wherein at least one of said first and second material has an inhomogeneous composition through the thickness of at least one of a respective layer, said inhomogeneous composition varying etching sensitivity over said thickness.

12. A method according to claim 11, wherein said first material is electrically insulating.

13. A method according to claim 11, wherein said second material is the material of said third movable electrodes, and wherein said step of etching a pattern of apertures also etches a pattern of said third movable electrodes.

14. A method according to claim 13, wherein said step of undercutting is carried out by at least one etchant having a greater etching sensitivity for said first material then said second material so that said plurality of discrete engaging points is formed as part of said third movable electrodes.

15. A method according to claim 13, wherein before said step of etching a pattern of apertures a further layer is provided on said layer of said second material, said further layer being of a material having properties similar to properties of said first material, and wherein at least a part of said third movable electrodes are etched in said further layer.

16. A method according to claim 13, wherein a layer of a third material is formed between said substrate and said layer of said first material, and wherein said layer of said third material is removed by selective etching after forming said plurality of discrete engaging points.

17. A method according to claim 13, wherein said layer of said first material has an etching sensitivity increasing in a direction toward said layer of said second material, said plurality of discrete engaging points being formed on said substrate.

18. A method according to claim 17, wherein a layer of a third material is formed between said layer of said first material and said layer of said second material, said layer of said third material being removed by selective etching after forming said plurality of discrete engaging points.

19. A method according to claim 14, wherein said first material decreases in etching sensitivity in a direction toward said layer of said second material.

20. A method according to claim 14, wherein before said step of etching a pattern of apertures a further layer is provided on said layer of said second material, said further layer being of a material having properties similar to properties of said first material, and wherein at least a part of said third movable electrodes are etched in said further layer.

21. A method according to claim 14, wherein a layer of a third material is formed between said substrate and said layer of said first material, and wherein said layer of said third material is removed by selective etching after forming said plurality of discrete engaging points.

22. A method according to claim 19, wherein before said step of etching a pattern of apertures a further layer is provided on said layer of said second material, said further layer being of a material having properties similar to properties of said first material, and wherein at least a part of said third movable electrodes are etched in said further layer.

23. A method according to claim 19, wherein a layer of a third material is formed between said substrate and said layer of said first material, and wherein said layer of said third material is removed by selective etching after forming said plurality of discrete engaging points.

24. A method according to claim 22, wherein a layer of a third material is formed between said substrate and said layer of said first material, and wherein said layer of said third material is removed by selective etching after forming said plurality of discrete engaging points.

* * * * *